US011937295B2

(12) United States Patent
Liu (10) Patent No.: US 11,937,295 B2
(45) Date of Patent: Mar. 19, 2024

(54) METHOD AND DEVICE FOR SENDING DISCOVERY SIGNAL (71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 483 days.

(21) Appl. No.: 17/226,668

(22) Filed: Apr. 9, 2021

(65) Prior Publication Data

US 2021/0235494 A1 Jul. 29, 2021

Related U.S. Application Data (63) Continuation of application No. PCT/CN2018/110853, filed on Oct. 18, 2018.

(51) Int. Cl.
*H04W 48/18* (2009.01)
*H04W 48/16* (2009.01)
*H04W 72/044* (2023.01)

(52) U.S. Cl.
CPC ..... *H04W 74/0808* (2013.01); *H04W 72/044* (2013.01)

(58) Field of Classification Search
CPC ........... H04W 74/0808; H04W 72/044; H04W 8/005
USPC ........................................................ 455/434
See application file for complete search history.

(56) References Cited

U.S. PATENT DOCUMENTS

2021/0176777 A1* 6/2021 Liu .................. H04W 72/1273

FOREIGN PATENT DOCUMENTS

| CN | 106455110 A | * | 2/2017 | ........ H04W 74/0808 |
| CN | 106455110 A | | 2/2017 | |
| CN | 108496390 A | | 9/2018 | |

OTHER PUBLICATIONS

English version of Search Report and Written Opinion of the International Search Authority in International Application No. PCT/CN2018/110853, dated Jul. 18, 2019.

* cited by examiner

*Primary Examiner* — Tanmay K Shah
(74) *Attorney, Agent, or Firm* — Finnegan, Henderson, Farabow, Garrett & Dunner, L.L.P.

(57) ABSTRACT

A method for sending a discovery signal includes: detecting whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold.

16 Claims, 6 Drawing Sheets

METHOD AND DEVICE FOR SENDING DISCOVERY SIGNAL

CROSS REFERENCE TO RELATED APPLICATIONS

This application is a continuation application of International Application No. PCT/CN2018/110853, filed on Oct. 18, 2018, the content of which is incorporated herein by reference in its entirety.

TECHNICAL FIELD

The present disclosure relates to a field of communication technology, and more particularly, to a method and a device for sending a discovery signal.

BACKGROUND

In the related art, researches have been recently conducted on the unlicensed spectrum of the fifth generation mobile communication system (5G) in the industry, and a scheme is proposed that supports independent networking for 5G unlicensed cells. In the independent networking design for 5G unlicensed spectrums, it is necessary for unlicensed frequency bands to follow the listen before talk (LBT) principle. That is, it is necessary to detect whether time-frequency resources are occupied before the signal is sent, the transmission of the signal in the time-frequency resources may be disabled if these time-frequency resources are occupied and the signal may be sent if they are not occupied. There are various LBT transmission mechanisms under the LBT principle. There is a need in a more effective solution about which LBT transmission mechanism is employed to send the discovery signal.

SUMMARY

According to a first aspect of embodiments of the present disclosure, a method for sending a discovery signal includes: detecting whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold.

According to a second aspect of embodiments of the present disclosure, a device for sending a discovery signal includes: a processor; and a memory for storing instructions executable by the processor. The processor is configured to: detect whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detect whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold.

According to a third aspect of embodiments of the present disclosure, a non-transitory computer-readable storage medium has computer instructions stored thereon that, when executed by a processor of a device, cause the device to perform a method for sending a discovery signal. The method includes: detecting whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold.

It should be understood that the above general description and the following detailed description are only exemplary and explanatory, and do not limit the present disclosure.

BRIEF DESCRIPTION OF THE DRAWINGS

The accompanying drawings are incorporated into the specification and constitute a part of the specification, show embodiments in accordance with the present disclosure, and are used to explain the principle of the present disclosure together with the specification.

DETAILED DESCRIPTION

Exemplary embodiments will be described in detail below, and examples thereof are illustrated in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the present disclosure as recited in the appended claims.

Under the LBT principle, there are a plurality of LBT mechanisms, and it is necessary to detect whether time-frequency resources are occupied and send information according to the LBT mechanism. Embodiments of the present disclosure provide an LBT mechanism switching scheme to adapt for changes in a network environment and ensure transmission of a discovery signal as much as possible.

Figure 1:
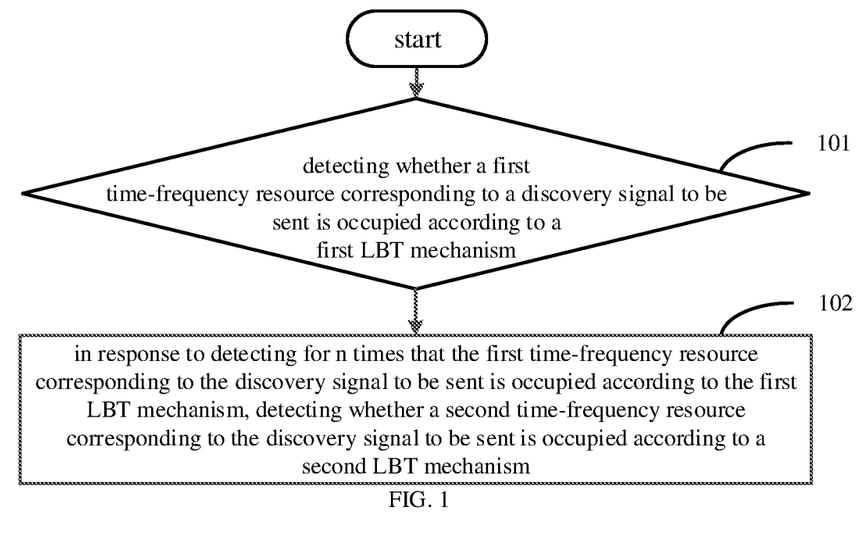
FIG. 1 is a flowchart illustrating a method for sending a discovery signal according to an exemplary embodiment.

FIG. 1 is a flowchart illustrating a method for sending a discovery signal according to an exemplary embodiment. The method for sending a discovery signal may be applied to an access network device, such as a base station. As illustrated in FIG. 1, the method includes the following blocks 101-102.

In block 101, it is detected whether a first time-frequency resource corresponding to a discovery signal to be sent is occupied according to a first LBT mechanism.

In block 102, in response to detecting for n times that the first time-frequency resource corresponding to the discovery signal to be sent is occupied according to the first LBT mechanism, it is detected whether a second time-frequency resource corresponding to the discovery signal to be sent is occupied according to a second LBT mechanism. The second time-frequency resource is a next time-frequency resource to the first time-frequency resource. The second LBT mechanism is a long-rule LBT mechanism with respect to the first LBT mechanism, and n is a positive integer meeting a preset first number threshold.

The embodiment provides an LBT mechanism switching scheme for the discovery signal, such as a discovery reference signal (DRS). The first LBT mechanism is preferred as a short-rule LBT mechanism. In response to detecting for n times that the first time-frequency resource corresponding to the discovery signal to be sent is occupied according to the first LBT mechanism, it is switched to the second LBT mechanism, a long-regular LBT mechanism, in order to adapt to, e.g., a deteriorating network environment. It can better ensure the transmission of the discovery signal.

When n does not reach the first number threshold, it is detected that the first time-frequency resource corresponding to the discovery signal to be sent is not occupied, the discovery signal is sent in the unoccupied first time-frequency resource according to the first LBT mechanism. At the same time, n is cleared. It is continued to detect whether the first time-frequency resource corresponding to the discovery signal to be sent is occupied according to the first LBT mechanism. If the first time-frequency resource is occupied, n is recounted.

When n reaches the first number threshold, it is detected whether the second time-frequency resource corresponding to the discovery signal to be sent is occupied according to the second LBT mechanism. At the same time, n is cleared.

The embodiment provides a two-level LBT mechanism switch. The first LBT mechanism belongs to a short-rule LBT mechanism, which may include a one-short mechanism, a CAT2 mechanism, etc. The second LBT mechanism is a long-rule LBT mechanism, which may include a CAT4 mechanism, etc. Alternatively, the first LBT mechanism may have a one-short mechanism, and the second LBT mechanism may have a CAT2 mechanism.

There may be one or more LBT mechanisms under each kind of LBT mechanism. When there are a plurality of LBT mechanisms at the same level, which LBT mechanism to select may be pre-configured (one LBT mechanism is fixed to select) or selected according to network environment factors.

In an embodiment, the method further includes: in response to detecting for m times that the second time-frequency resource corresponding to the discovery signal to be sent is occupied according to the second LBT mechanism, it is detected whether a third time-frequency resource corresponding to the discovery signal to be sent is occupied according to a third LBT mechanism. The third time-frequency resource is a next time-frequency resource to the second time-frequency resource. The third LBT mechanism is a long-rule LBT mechanism with respect to the second LBT mechanism, and m is a positive integer meeting a preset second number threshold.

In the embodiment, the second time-frequency resource corresponding to the discovery signal to be sent is detected for m times according to the second LBT mechanism is occupied, which indicates that the network environment continues deteriorating and a second switch can be performed. It is detected whether the third time-frequency resource corresponding to the discovery signal to be sent is occupied according to the third LBT mechanism. The embodiment provides a three-level LBT mechanism to support the second switch of the LBT mechanism, so as to better adapt to the network environment and try to ensure the transmission of the discovery signal.

When m does not reach the second number threshold, it is detected that the second time-frequency resource corresponding to the discovery signal to be sent is not occupied, the discovery signal is sent in the unoccupied second time-frequency resource according to the second LBT mechanism. At the same time, m is cleared. It is continued to detect whether the second time-frequency resource corresponding to the discovery signal to be sent is occupied according to the second LBT mechanism. If the second time-frequency resource is occupied, m is recounted.

When m reaches the second number threshold, it is detected whether the third time-frequency resource corresponding to the discovery signal to be sent is occupied according to the third LBT mechanism. At the same time, m is cleared.

The embodiment provides a three-level LBT mechanism switch. The first LBT mechanism belongs to a short-rule LBT mechanism, which may include a one-short mechanism, etc. The second LBT mechanism belongs to a medium-length rule LBT mechanism, which may include a CAT2 mechanism, etc. The third LBT mechanism belongs to a medium-length rule LBT mechanism, which may have a CAT4 mechanism.

In an embodiment, the method further includes: in response to detecting that the third time-frequency resource corresponding to the discovery signal to be sent is not occupied according to the third LBT mechanism, the discovery signal is sent in the unoccupied third time-frequency resource according to the third LBT mechanism. The embodiment follows the LBT principle, and in response to detecting that the third time-frequency resource corresponding to the discovery signal to be sent is not occupied according to the third LBT mechanism, the discovery signal is sent according to the third LBT mechanism.

In an embodiment, the method further includes: in response to detecting for k times that the third time-frequency resource corresponding to the discovery signal to be sent is not occupied according to the third LBT mechanism, it is detected whether the second time-frequency resource corresponding to the discovery signal to be sent is occupied according to the second LBT mechanism, where k is a positive integer meeting a preset third number threshold.

The embodiment provides a fallback switching strategy of the LBT mechanism. The third time-frequency resource corresponding to the discovery signal to be sent is detected for k times to be unoccupied according to the third LBT mechanism, which indicates that the network environment is improved. It may be continued to detect whether the second time-frequency resource corresponding to the discovery signal to be sent is occupied with the second LBT mechanism, so as to better adapt to the network environment and try to ensure the transmission of the discovery signal.

When k does not reach the third number threshold, it is detected that the third time-frequency resource corresponding to the discovery signal to be sent is not occupied, the discovery signal is sent in the unoccupied third time-frequency resource according to the third LBT mechanism. At the same time, k is cleared. It is continued to detect whether the third time-frequency resource corresponding to the discovery signal to be sent is occupied according to the third LBT mechanism. If the time-frequency resource is not occupied, it starts to recount k.

When k reaches the third number threshold, it is detected whether the second time-frequency resource corresponding to the discovery signal to be sent is occupied according to the second LBT mechanism. At the same time, k is cleared.

In an embodiment, the method further includes: in response to detecting that the second time-frequency resource corresponding to the discovery signal to be sent is not occupied according to the second LBT mechanism, the discovery signal is sent in the unoccupied second time-frequency resource according to the second LBT mechanism. The embodiment follows the LBT principle, and in response to detecting that the second time-frequency resource corresponding to the discovery signal to be sent is not occupied according to the second LBT mechanism, the discovery signal is sent according to the second LBT mechanism.

In an embodiment, the method further includes: in response to detecting for l times that the second time-frequency resource corresponding to the discovery signal to be sent is not occupied according to the second LBT mechanism, it is detected whether the first time-frequency resource corresponding to the discovery signal to be sent is occupied according to the first LBT mechanism, where l is a positive integer meeting a preset fourth number threshold.

The embodiment provides a fallback switching strategy of the LBT mechanism, which may be a fallback for two times or one time. The second time-frequency resource corresponding to the discovery signal to be sent is detected for l times to be unoccupied according to the second LBT mechanism, which indicates that the network environment is further improved. It may be continued to detect whether the first time-frequency resource corresponding to the discovery signal to be sent is occupied with the first LBT mechanism, so as to better adapt to the network environment and try to ensure the transmission of the discovery signal.

When l does not reach the fourth number threshold, it is detected that the time-frequency resource corresponding to the discovery signal to be sent is not occupied, the discovery signal is sent in the unoccupied second time-frequency resource according to the second LBT mechanism. At the same time, l is cleared to 0. If the three-level switch is supported, it is then continued to detect whether the second time-frequency resource corresponding to the discovery signal to be sent is occupied according to the second LBT mechanism, and it starts to count m if the second time-frequency resource is occupied. If the second time-frequency resource is not occupied, it starts to count l and clear m.

When l reaches the fourth number threshold, it is detected whether the first time-frequency resource corresponding to the discovery signal to be sent is occupied according to the first LBT mechanism. At the same time, l is cleared.

In an embodiment, the method further includes: in response to detecting that the first time-frequency resource corresponding to the discovery signal to be sent is not occupied according to the first LBT mechanism, the discovery signal is sent in the unoccupied first time-frequency resource according to the first LBT mechanism. The embodiment follows the LBT principle, and in response to detecting that the second time-frequency resource corresponding to the discovery signal to be sent is not occupied according to the second LBT mechanism, the discovery signal is sent according to the second LBT mechanism. And n is cleared to zero.

In some embodiments, the value of n, m, k, and l in the above embodiments may range from 2 to 5, etc.

In an embodiment, the LBT mechanism includes a preset detection time window, and the preset detection time window is selected from a plurality of configured detection time windows according to the network environment. The detection time window may be a fixed duration which is calculated forward from the current moment, such that the detection time window may be a movable fixed duration.

The LBT mechanism includes at least one of a first LBT mechanism, a second LBT mechanism, and a third LBT mechanism.

In the embodiment, the detection is performed for n times according to the first LBT mechanism within the preset detection time window, i.e., it is detected for n times whether the first time-frequency resource corresponding to the discovery signal to be sent is occupied. If the first time-frequency resource detected for n times (continuous or discontinuous n times, i.e., n reaches the first number threshold) is all occupied within the preset detection time window, it is continued to detect whether the second time-frequency resource corresponding to the discovery signal to be sent is occupied according to the second LBT mechanism.

A corresponding detection time window may also be used when the detection is performed according to the second or third LBT mechanism.

Different LBT mechanisms may correspond to the same or different detection time windows. The length of detection time window is not less than the total duration required for detection of a preset number threshold (the first, second, third, and fourth number threshold) in the corresponding LBT mechanism.

In an embodiment, the base station may configure a plurality of detection time windows for different scenarios in advance. For example, when the detection is performed for n times according to the first LBT mechanism, a detection time window 1 and a detection time window 2 may be configured, in which the length of the detection time window 1 is less than that of the detection time window 2. A detection time window may be selected from the detection time window 1 and the detection time window 2. In the selected detection time window, the first time-frequency resource detected for n times is all occupied, it is then continued to detect whether the second time-frequency resource corresponding to the discovery signal to be sent is occupied according to the second LBT mechanism.

In an embodiment, whether the detection time window 1 or the detection time window 2 is selected based on the network environment, such as an interference level, an uplink and downlink transmission frequency, etc. For example, if the network interference is relatively large, the detection time window 2 is selected. If the uplink and downlink transmission frequency is relatively large, the detection time window 1 is selected.

Figure 2:
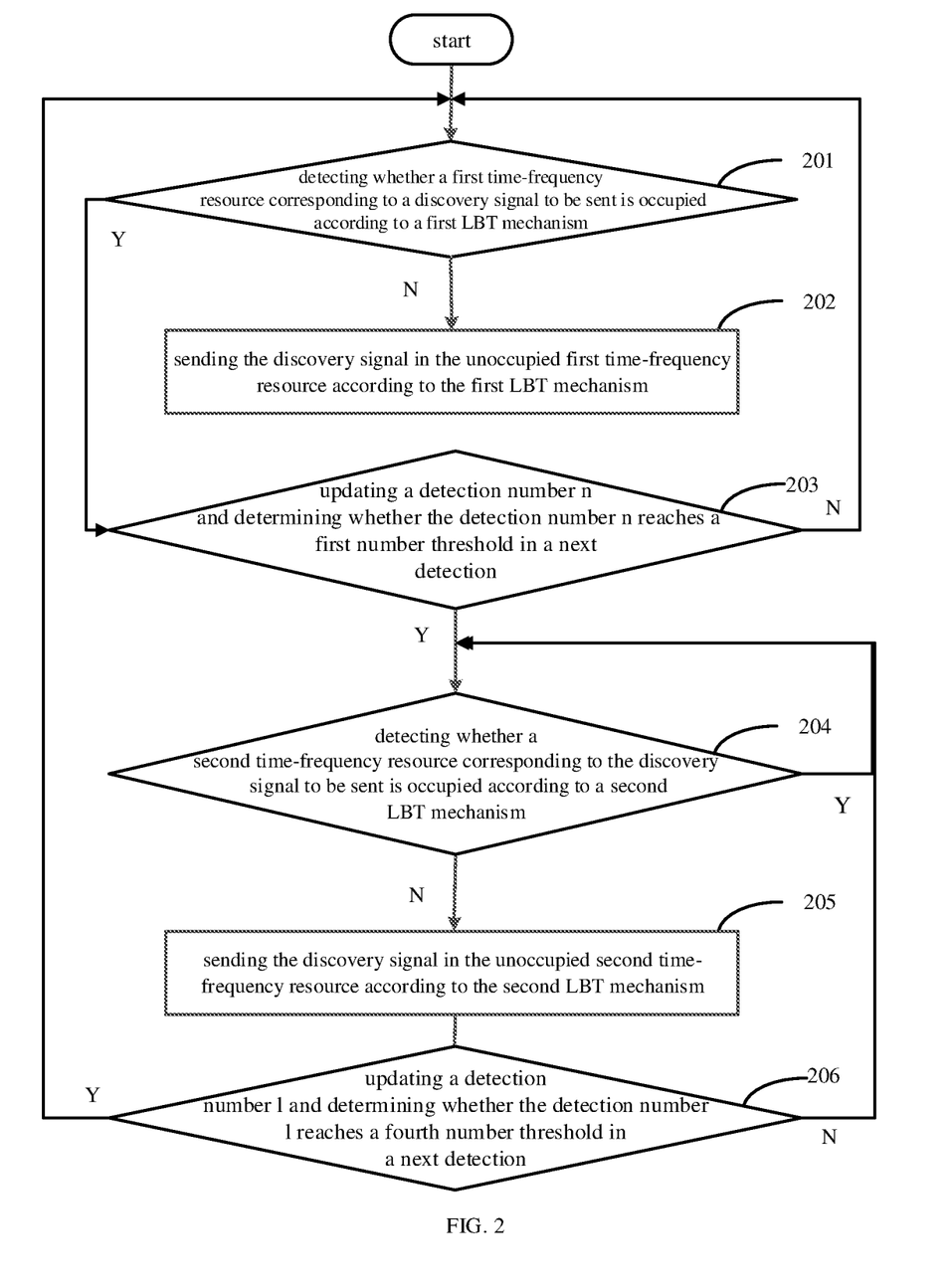
FIG. 2 is a flowchart illustrating a method for sending a discovery signal according to an exemplary embodiment.

FIG. 2 is a flowchart illustrating a method for sending a discovery signal according to an exemplary embodiment. The method for sending a discovery signal may be applied to an access network device, such as a base station. As illustrate in FIG. 2, the method includes the following blocks 201-206.

In block 201, it is detected whether a first time-frequency resource corresponding to a discovery signal to be sent is occupied according to a first LBT mechanism. In response to detecting that the first time-frequency resource corresponding to the discovery signal to be sent is not occupied according to the first LBT mechanism, block 202 is continued. At the same time, the detection number is cleared to zero. In response to detecting that the first time-frequency resource corresponding to the discovery signal to be sent is occupied according to the first LBT mechanism, the current transmission is disabled and block 203 may be continued.

In block 202, the discovery signal is sent in the unoccupied first time-frequency resource according to the first LBT mechanism, and block 201 may be continued.

In block 203, a detection number n is updated, and it is determined whether the detection number n reaches a first number threshold in a next detection. When the first number threshold is reached, block 204 is continued. When the first number threshold is not reached, block 201 is continued.

In block 204, it is detected whether a second time-frequency resource corresponding to the discovery signal to be sent is occupied according to a second LBT mechanism. In response to detecting that the second time-frequency resource corresponding to the discovery signal to be sent is not occupied according to the second LBT mechanism, block 205 and block 206 are continued, and the detection number is cleared to zero at the same time. In response to detecting that the second time-frequency resource corresponding to the discovery signal to be sent is occupied according to the second LBT mechanism, the current transmission is disabled and block 204 may be continued.

In block 205, the discovery signal is sent in the unoccupied second time-frequency resource according to the second LBT mechanism.

In block 206, a detection number 1 is updated, and it is determined whether the detection number 1 reaches a fourth number threshold in a next detection. When the fourth number threshold is reached, block 201 is continued. When the fourth number threshold is not reached, block 204 is continued.

Figure 3:
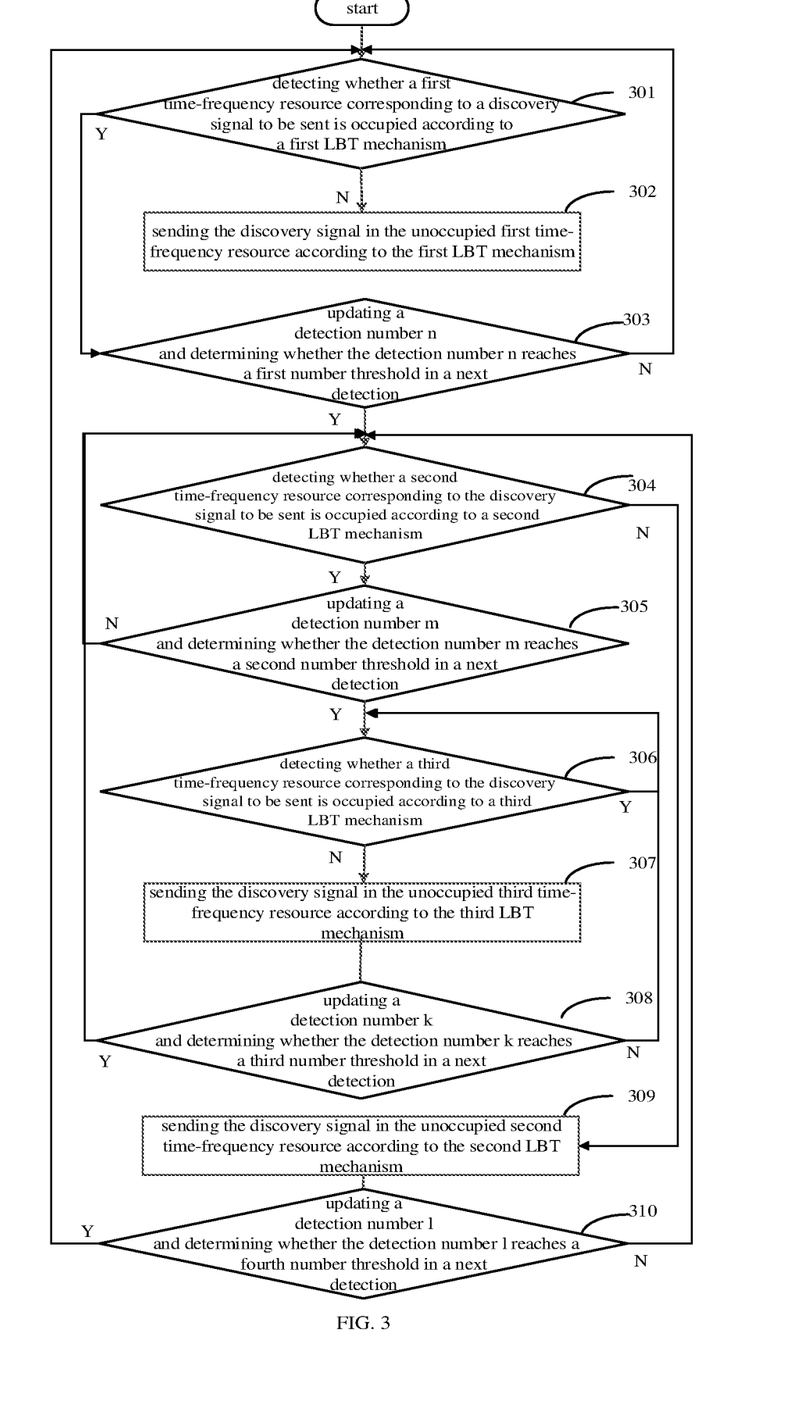
FIG. 3 is a flowchart illustrating a method for sending a discovery signal according to an exemplary embodiment.

FIG. 3 is a flowchart illustrating a method for sending a discovery signal according to an exemplary embodiment. The method for sending a discovery signal may be applied to an access network device, such as a base station. As illustrated in FIG. 3, the method includes the following blocks 301-310.

In block 301, it is detected whether a first time-frequency resource corresponding to a discovery signal to be sent is occupied according to a first LBT mechanism. In response to detecting that the first time-frequency resource corresponding to the discovery signal to be sent is not occupied according to the first LBT mechanism, block 302 is continued. At the same time, the detection number is cleared to zero. In response to detecting that the first time-frequency resource corresponding to the discovery signal to be sent is occupied according to the first LBT mechanism, the current transmission is disabled and block 303 may be continued.

In block 302, the discovery signal is sent in the unoccupied first time-frequency resource according to the first LBT mechanism, and block 301 may be continued.

In block 303, a detection number n is updated, and it is determined whether the detection number n reaches a first number threshold in a next detection. When the first number threshold is reached, block 304 is continued. When the first number threshold is not reached, block 301 is continued.

In block 304, it is detected whether a second time-frequency resource corresponding to the discovery signal to be sent is occupied according to a second LBT mechanism. In response to detecting that the second time-frequency resource corresponding to the discovery signal to be sent is not occupied according to the second LBT mechanism, block 309 and block 310 are continued, and the detection number is cleared to zero at the same time. In response to detecting that the second time-frequency resource corresponding to the discovery signal to be sent is occupied according to the second LBT mechanism, the current transmission is disabled and block 305 may be continued.

In block 305, a detection number m is updated, and it is determined whether the detection number m reaches a second number threshold in a next detection. When the second number threshold is reached, block 306 is continued. When the second number threshold is not reached, block 304 is continued.

In block 306, it is detected whether a third time-frequency resource corresponding to the discovery signal to be sent is occupied according to a third LBT mechanism. In response to detecting that the third time-frequency resource corresponding to the discovery signal to be sent is not occupied according to the third LBT mechanism, block 307 and block 308 are continued. When the third time-frequency resource is occupied, this transmission is disabled, and block 306 may be continued.

In block 307, the discovery signal is sent in the unoccupied third time-frequency resource according to the third LBT mechanism.

In block 308, the detection number k is updated, and it is determined whether the detection number k reaches a third number threshold in a next detection. When the third number threshold is reached, block 304 is continued. When the third threshold is not reached, block 306 is continued.

In block 309, the discovery signal is sent in the unoccupied second time-frequency resource according to the second LBT mechanism.

In block 310, a detection number 1 is updated, and it is determined whether the detection number 1 reaches a fourth number threshold in a next detection. When the fourth number threshold is reached, block 301 is continued. When the fourth times threshold is not reached, block 304 is continued.

The above embodiments may be combined according to actual needs.

The following are apparatus embodiments of the present disclosure, which may be used to implement the method embodiments of the present disclosure.

Figure 4:
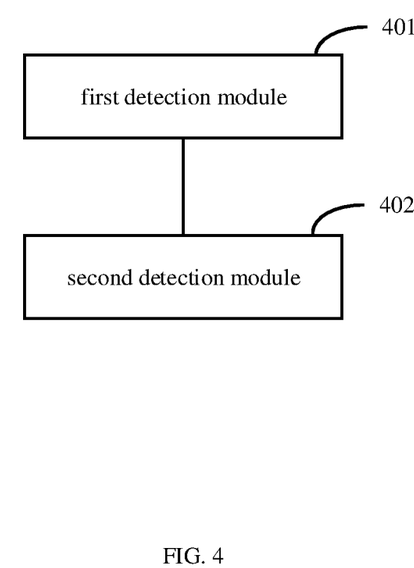
FIG. 4 is a block diagram illustrating an apparatus for sending a discovery signal according to an exemplary embodiment.

FIG. 4 is a block diagram illustrating an apparatus for sending a discovery signal according to an exemplary embodiment. Each module in the apparatus may be implemented in software, or hardware, or a combination thereof. Referring to FIG. 4, the apparatus for sending a discovery signal includes a first detection module 401 and a second detection module 402.

The first detection module 401 is configured to detect whether a first time-frequency resource corresponding to a discovery signal to be sent is occupied according to a first listen before talk (LBT) mechanism.

The second detection module 402 is configured to detect whether a second time-frequency resource corresponding to the discovery signal to be sent according to a second LBT mechanism, in response to detecting for n times that the first time-frequency resources corresponding to the discovery signal to be sent is occupied according to the first LBT mechanism. The second LBT mechanism is a long-rule LBT mechanism with respect to the first LBT mechanism, and n is a positive integer meeting a preset first number threshold.

Figure 5:
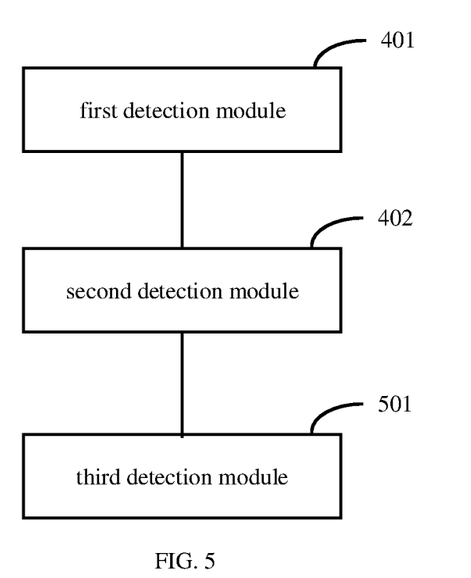
FIG. 5 is a block diagram illustrating an apparatus for sending a discovery signal according to an exemplary embodiment.

In an embodiment, as illustrated in FIG. 5, the apparatus further includes a third detection module 501. The third detection module 501 is configured to detect whether a third time-frequency resource corresponding to the discovery signal to be sent is occupied according to a third LBT mechanism, in response to detecting for m times that the second time-frequency resource corresponding to the discovery signal to be sent is occupied according to the second LBT mechanism. The third LBT mechanism is a long-rule LBT mechanism with respect to the second LBT mechanism, and m is a positive integer meeting a preset second number threshold.

Figure 6:
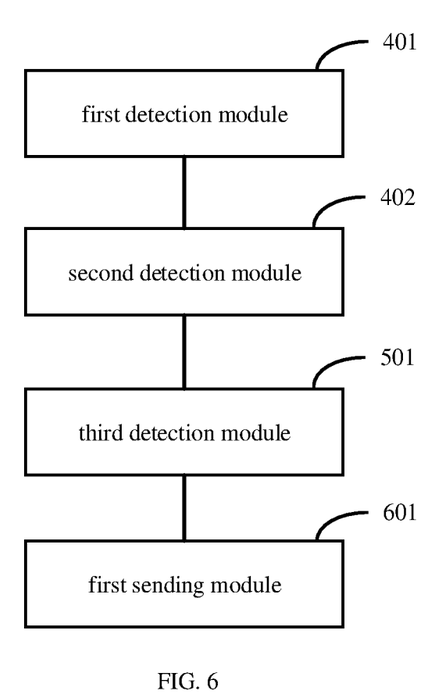
FIG. 6 is a block diagram illustrating an apparatus for sending a discovery signal according to an exemplary embodiment.

In an embodiment, as illustrated in FIG. 6, the apparatus further includes a first sending module 601. The first sending module 601 is configured to send the discovery signal in the unoccupied third time-frequency resource according to the third LBT mechanism in response to detecting that the third time-frequency resource corresponding to the discovery signal to be sent is not occupied according to the third LBT mechanism.

Figure 7:
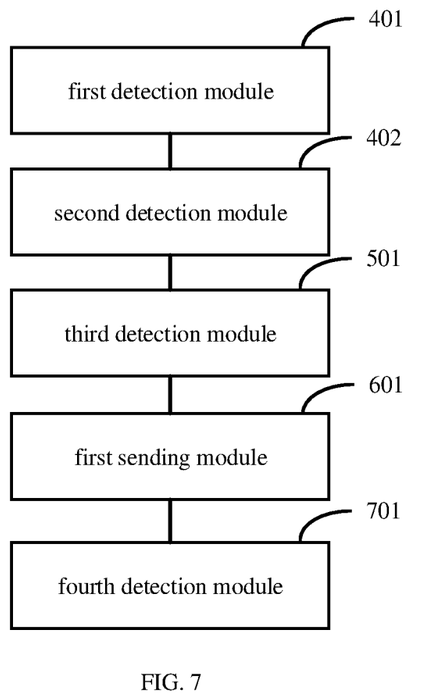
FIG. 7 is a block diagram illustrating an apparatus for sending a discovery signal according to an exemplary embodiment.

In an embodiment, as illustrated in FIG. 7, the apparatus further includes a fourth detection module 701. The fourth detection module 701 is configured to detect whether the second time-frequency resource corresponding to the discovery signal to be sent is occupied according to the second LBT mechanism in response to detecting fork times that the third time-frequency resource corresponding to the discovery signal to be sent is not occupied according to the third LBT mechanism, where k is a positive integer meeting a preset third number threshold.

Figure 8:
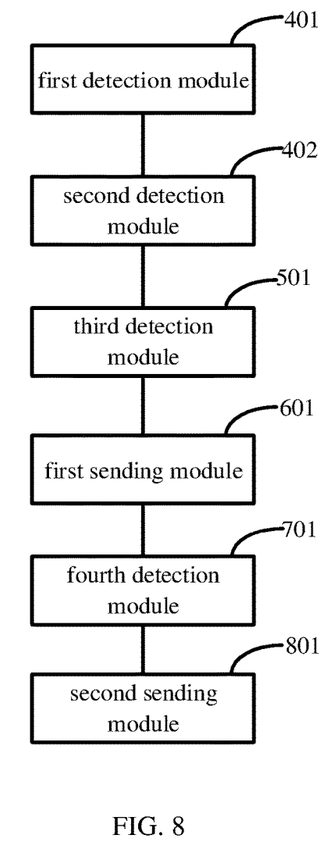
FIG. 8 is a block diagram illustrating an apparatus for sending a discovery signal according to an exemplary embodiment.

In an embodiment, as illustrated in FIG. 8, the apparatus further includes a second sending module 801. The second sending module 801 is configured to send the discovery signal in the unoccupied second time-frequency resource according to the second LBT mechanism in response to detecting that the second time-frequency resource corresponding to the discovery signal to be sent is not occupied according to the second LBT mechanism.

Figure 9:
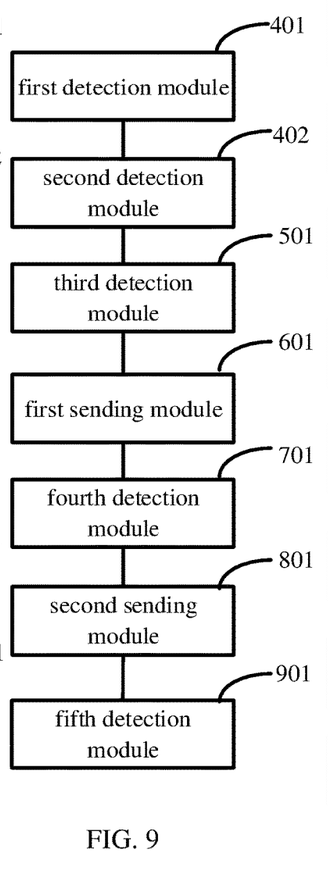
FIG. 9 is a block diagram illustrating an apparatus for sending a discovery signal according to an exemplary embodiment.

In an embodiment, as illustrated in FIG. 9, the apparatus further includes a fifth detection module 901. The fifth detection module 901 is configured to detect whether the first time-frequency resource corresponding to the discovery signal to be sent is occupied according to the first LBT mechanism in response to detecting for l times that the second time-frequency resource corresponding to the discovery signal to be sent is not occupied according to the second LBT mechanism, where l is a positive integer meeting a preset fourth number threshold.

Figure 10:
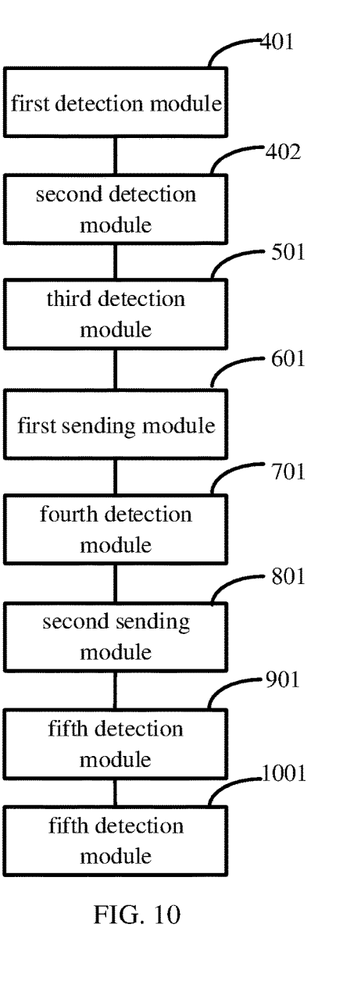
FIG. 10 is a block diagram illustrating an apparatus for sending a discovery signal according to an exemplary embodiment.

In an embodiment, as illustrated in FIG. 10, the apparatus further includes a third sending module 1001. The third sending module 1001 is configured to send the discovery signal in the unoccupied first time-frequency resource according to the first LBT mechanism in response to detecting that the first time-frequency resource corresponding to the discovery signal to be sent is not occupied according to the first LBT mechanism.

In an embodiment, the LBT mechanism includes a preset detection time window, and the preset detection time window is selected from a plurality of configured detection time windows according to the network environment. The LBT mechanism may include at least one of a first LBT mechanism, a second LBT mechanism, or a third LBT mechanism.

Regarding the apparatuses in the above embodiments, the specific manner in which each module performs the operation has been described in detail in the related method embodiments, which will not be repeated here.

Figure 11:
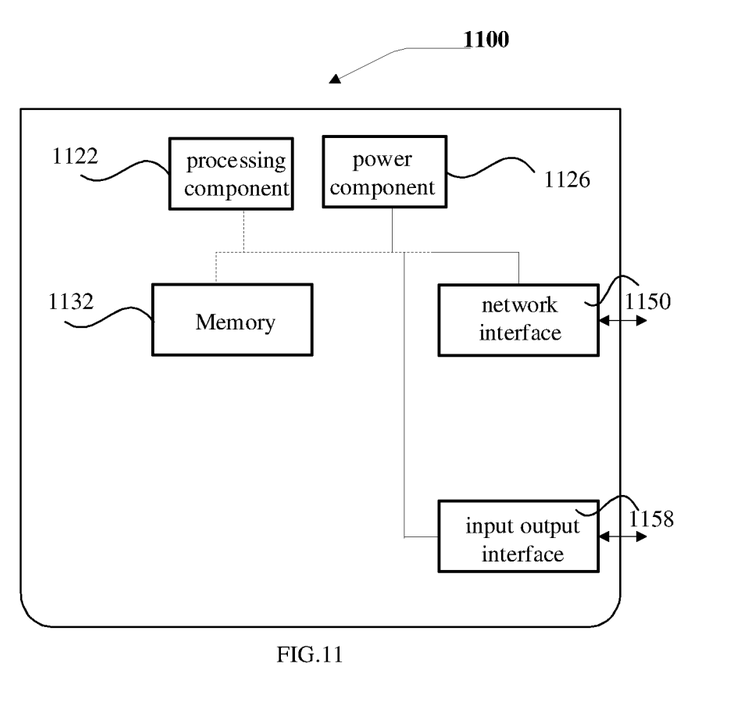
FIG. 11 is a block diagram illustrating a device for sending a discovery signal according to an exemplary embodiment.

FIG. 11 is a block diagram illustrating a device 1100 for sending a discovery signal according to an exemplary embodiment. For example, the device 1100 may be a network access device, such as a base station. Referring to FIG. 11, the device 1100 includes a processing component 1122 further including one or more processors, and a memory resource represented by a memory 1132 for storing instructions executable by the processing component 1122, such as application programs. The application program stored in the memory 1132 may include one or more modules each corresponding to a set of instructions. In addition, the processing component 1122 is configured to execute instructions to perform the above method for sending a discovery signal.

The device 1100 may also include a power component 1126 configured to perform power management of the device 1100, a wired or wireless network interface 1150 configured to connect the device 1100 to a network, and an input output (I/O) interface 1158. The device 1100 may be operated based on an operating system stored in the memory 1132, such as Windows Server™, Mac OS X™, Unix™, Linux™, FreeBSD™ or the like.

In an exemplary embodiment, a device for sending a discovery signal includes: a processor; and a memory for storing instructions executable by the processor. The processor is configured to detect whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detect whether a second time-frequency resource corresponding to the discovery signal to be sent is occupied according to a second LBT mechanism. The second time-frequency resource is a next time-frequency resource to the first time-frequency resource. The second LBT mechanism is a long-rule LBT mechanism with respect to the first LBT mechanism, and n is a positive integer meeting a preset first number threshold.

The processor may be further configured to: detect whether a third time-frequency resource corresponding to the discovery signal to be sent is occupied according to a third LBT mechanism in response to detecting for m times that the second time-frequency resource corresponding to the discovery signal to be sent is occupied according to the second LBT mechanism. The third time-frequency resource is a next time-frequency resource to the second time-frequency resource. The third LBT mechanism is a long-rule LBT mechanism with respect to the second LBT mechanism, and m is a positive integer meeting a preset second number threshold.

The processor may be further configured to: send the discovery signal in the unoccupied third time-frequency resource according to the third LBT mechanism in response to detecting that the third time-frequency resource corresponding to the discovery signal to be sent is not occupied according to the third LBT mechanism.

The processor may be further configured to: detect whether the second time-frequency resource corresponding to the discovery signal to be sent is occupied according to the second LBT mechanism in response to detecting for k times that the third time-frequency resource corresponding to the discovery signal to be sent is not occupied according to the third LBT mechanism, where k is a positive integer meeting a preset third number threshold.

The processor may be further configured to: send the discovery signal in the unoccupied second time-frequency resource according to the second LBT mechanism in response to detecting that the second time-frequency resource corresponding to the discovery signal to be sent is not occupied according to the second LBT mechanism.

The processor may be further configured to: detect whether the first time-frequency resource corresponding to the discovery signal to be sent is occupied according to the first LBT mechanism in response to detecting for l times that the second time-frequency resource corresponding to the discovery signal to be sent is not occupied according to the second LBT mechanism, where l is a positive integer meeting a preset fourth number threshold.

The processor may be further configured to: send the discovery signal in the unoccupied first time-frequency resource according to the first LBT mechanism in response to detecting that the first time-frequency resource corresponding to the discovery signal to be sent is not occupied according to the first LBT mechanism.

At least one of the first LBT mechanism, the second LBT mechanism, or the third LBT mechanism may include a preset detection time window, and the preset detection time window may be selected from a plurality of configured detection time windows according to the network environment.

In an exemplary embodiment, a non-transitory computer-readable storage medium has stored thereon instructions that, when executed by a processor of a device, cause the device to perform a method for sending a discovery signal. The method includes: detecting whether a first time-frequency resource corresponding to a discovery signal to be sent is occupied according to a first listen before talk (LBT) mechanism; and in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism. The second time-frequency resource is a next time-frequency resource to the first time-frequency resource. The second LBT mechanism is a long-rule LBT mechanism with respect to the first LBT mechanism, and n is a positive integer meeting a preset first number threshold.

The method further includes: in response to detecting for m times that the second time-frequency resource corresponding to the discovery signal to be sent is occupied according to the second LBT mechanism, detecting whether a third time-frequency resource corresponding to the discovery signal to be sent is occupied according to a third LBT mechanism. The third time-frequency resource is a next time-frequency resource to the second time-frequency resource. The third LBT mechanism is a long-rule LBT mechanism with respect to the second LBT mechanism, and m is a positive integer meeting a preset second number threshold.

The method further includes: in response to detecting that the third time-frequency resource corresponding to the discovery signal to be sent is not occupied according to the third LBT mechanism, sending the discovery signal in the unoccupied third time-frequency resource according to the third LBT mechanism.

The method further includes: in response to detecting for k times that the third time-frequency resource corresponding to the discovery signal to be sent is not occupied according to the third LBT mechanism, detecting whether the second time-frequency resource corresponding to the discovery signal to be sent is occupied according to the second LBT mechanism, where k is a positive integer meeting a preset third number threshold.

The method further includes: in response to detecting that the second time-frequency resource corresponding to the discovery signal to be sent is not occupied according to the second LBT mechanism, sending the discovery signal in the unoccupied second time-frequency resource according to the second LBT mechanism.

The method further includes: in response to detecting for l times that the second time-frequency resource corresponding to the discovery signal to be sent is not occupied according to the second LBT mechanism, detecting whether the first time-frequency resource corresponding to the discovery signal to be sent is occupied according to the first LBT mechanism, where l is a positive integer meeting a preset fourth number threshold.

The method further includes: in response to detecting that the first time-frequency resource corresponding to the discovery signal to be sent is not occupied according to the first LBT mechanism, sending the discovery signal in the unoccupied first time-frequency resource according to the first LBT mechanism.

At least one of the first LBT mechanism, the second LBT mechanism, or the third LBT mechanism may include a preset detection time window, and the preset detection time window is selected from a plurality of configured detection time windows according to the network environment.

Other implementations of the present disclosure will be apparent to those skilled in the art from consideration of the specification and practice of the present disclosure herein. This application is intended to cover any variations, uses, or adaptive changes of the present disclosure which follow the general principles of the present disclosure and include common knowledge or conventional technical means in the technical field that are not disclosed by the present disclosure. The specification and the embodiments are to be regarded as exemplary only, and the true scope and spirit of the present disclosure are indicated by the following claims.

It should be understood that the present disclosure is not limited to the precise structure that has been described above and illustrated in the drawings, and various modifications and changes may be made without departing from its scope. The scope of the present disclosure is only limited by the appended claims.

What is claimed is:

1. A method for sending a discovery signal, comprising:
   detecting whether a first time-frequency resource corresponding to a discovery signal to be sent is occupied according to a first listen before talk (LBT) mechanism;
   in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold;
   in response to detecting that the second time-frequency resource corresponding to the discovery signal to be sent is not occupied according to the second LBT mechanism, sending the discovery signal in the unoccupied second time-frequency resource according to the second LBT mechanism; and
   in response to detecting for I times that the second time-frequency resource corresponding to the discovery signal to be sent is not occupied according to the second LBT mechanism, detecting whether the first time-frequency resource corresponding to the discovery signal to be sent is occupied according to the first LBT mechanism, wherein I is a positive integer meeting a preset second number threshold.

2. The method of claim 1, further comprising:
   in response to detecting for m times that the second time-frequency resource corresponding to the discovery signal to be sent is occupied according to the second LBT mechanism, detecting whether a third time-frequency resource corresponding to the discovery signal to be sent is occupied according to a third LBT mechanism; wherein the third time-frequency resource is a next time-frequency resource to the second time-frequency resource, the third LBT mechanism is a long-rule LBT mechanism with respect to the second LBT mechanism, and m is a positive integer meeting a preset third number threshold.

3. The method of claim 2, further comprising:
   in response to detecting that the third time-frequency resource corresponding to the discovery signal to be sent is not occupied according to the third LBT mechanism, sending the discovery signal in the unoccupied third time-frequency resource according to the third LBT mechanism.

4. The method of claim 3, further comprising:
   in response to detecting for k times that the third time-frequency resource corresponding to the discovery signal to be sent is not occupied according to the third LBT mechanism, detecting whether the second time-frequency resource corresponding to the discovery signal to be sent is occupied according to the second LBT mechanism, wherein k is a positive integer meeting a preset fourth number threshold.

5. The method according to claim 2, wherein at least one of the first LBT mechanism, the second LBT mechanism, or the third LBT mechanism comprises a preset detection time window, and the preset detection time window is selected from a plurality of configured detection time windows according to a network environment.

6. The method of claim 1, further comprising:
   in response to detecting that the first time-frequency resource corresponding to the discovery signal to be sent is not occupied according to the first LBT mechanism, sending the discovery signal in the unoccupied first time-frequency resource according to the first LBT mechanism.

7. A device for sending a discovery signal, comprising:
   a processor; and
   a memory for storing instructions executable by the processor;
   wherein the processor is configured to:
   detect whether a first time-frequency resource corresponding to a discovery signal to be sent is occupied according to a first listen before talk (LBT) mechanism;
   in response to detecting for n times that the first time-frequency resource corresponding to the discovery signal to be sent is occupied according to the first LBT mechanism, detect whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold;
   in response to detecting that the second time-frequency resource corresponding to the discovery signal to be sent is not occupied according to the second LBT mechanism, send the discovery signal in the unoccupied second time-frequency resource according to the second LBT mechanism; and
   in response to detecting for I times that the second time-frequency resource corresponding to the discovery signal to be sent is not occupied according to the second LBT mechanism, detect whether the first time-frequency resource corresponding to the discovery signal to be sent is occupied according to the first LBT mechanism, wherein I is a positive integer meeting a preset second number threshold.

8. The device of claim 7, wherein the processor is further configured to:
   detect whether a third time-frequency resource corresponding to the discovery signal to be sent is occupied according to a third LBT mechanism, in response to detecting for m times that the second time-frequency resource corresponding to the discovery signal to be sent is occupied according to the second LBT mechanism; wherein the third time-frequency resource is a next time-frequency resource to the second time-frequency resource, the third LBT mechanism is a long-rule LBT mechanism with respect to the second LBT mechanism, and m is a positive integer meeting a preset third number threshold.

9. The device of claim 8, wherein the processor is further configured to:
   send the discovery signal in the unoccupied third time-frequency resource according to the third LBT mechanism in response to detecting that the third time-frequency resource corresponding to the discovery signal to be sent is not occupied according to the third LBT mechanism.

10. The device of claim 9, wherein the processor is further configured to:
    detect whether the second time-frequency resource corresponding to the discovery signal to be sent is occupied according to the second LBT mechanism in response to detecting for k times that the third time-frequency resource corresponding to the discovery signal to be sent is not occupied according to the third LBT mechanism, wherein k is a positive integer meeting a preset fourth number threshold.

11. The device of claim 8, wherein at least one of a first LBT mechanism, a second LBT mechanism, or a third LBT mechanism comprises a preset detection time window, and the preset detection time window is selected from a plurality of configured detection time windows according to a network environment.

12. The device of claim 7, wherein the processor is further configured to:
   send the discovery signal in the unoccupied first time-frequency resource according to the first LBT mechanism in response to detecting that the first time-frequency resource corresponding to the discovery signal to be sent is not occupied according to the first LBT mechanism.

13. A non-transitory computer-readable storage medium having computer instructions stored thereon that, when executed by a processor of a device, cause the device to perform a method for sending a discovery signal, the method comprising:
   detecting whether a first time-frequency resource corresponding to a discovery signal to be sent is occupied according to a first listen before talk (LBT) mechanism;
   in response to detecting for n times that the first time-frequency resource corresponding to the discovery signal to be sent is occupied according to the first LBT mechanism, detecting whether a second time-frequency resource corresponding to the discovery signal to be sent is occupied according to a second LBT mechanism; wherein the second time-frequency resource is a next time-frequency resource to the first time-frequency resource, the second LBT mechanism is a long-rule LBT mechanism with respect to the first LBT mechanism, and n is a positive integer meeting a preset first number threshold;
   in response to detecting that the second time-frequency resource corresponding to the discovery signal to be sent is not occupied according to the second LBT mechanism, sending the discovery signal in the unoccupied second time-frequency resource according to the second LBT mechanism; and
   in response to detecting for I times that the second time-frequency resource corresponding to the discovery signal to be sent is not occupied according to the second LBT mechanism, detecting whether the first time-frequency resource corresponding to the discovery signal to be sent is occupied according to the first LBT mechanism, wherein I is a positive integer meeting a preset second number threshold.

14. The non-transitory computer-readable storage medium of claim 13, wherein the method further comprises:
   in response to detecting for m times that the second time-frequency resource corresponding to the discovery signal to be sent is occupied according to the second LBT mechanism, detecting whether a third time-frequency resource corresponding to the discovery signal to be sent is occupied according to a third LBT mechanism; wherein the third time-frequency resource is a next time-frequency resource to the second time-frequency resource, the third LBT mechanism is a long-rule LBT mechanism with respect to the second LBT mechanism, and m is a positive integer meeting a preset third number threshold.

15. The non-transitory computer-readable storage medium of claim 14, wherein the method further comprises:
   in response to detecting that the third time-frequency resource corresponding to the discovery signal to be sent is not occupied according to the third LBT mechanism, sending the discovery signal in the unoccupied third time-frequency resource according to the third LBT mechanism.

16. The non-transitory computer-readable storage medium of claim 15, wherein the method further comprises:
   in response to detecting for k times that the third time-frequency resource corresponding to the discovery signal to be sent is not occupied according to the third LBT mechanism, detecting whether the second time-frequency resource corresponding to the discovery signal to be sent is occupied according to the second LBT mechanism, wherein k is a positive integer meeting a preset fourth number threshold.

* * * * *